INVENTOR.
RICHARD F. LOUMEAU
BY
Moody and Phillion
ATTORNEYS

Aug. 22, 1967 R. F. LOUMEAU 3,337,850

DIGITAL PHASE TRANSITION DETECTOR

Filed Oct. 21, 1963 6 Sheets-Sheet 2

INVENTOR.
RICHARD F. LOUMEAU

BY

Moody and Phillion

ATTORNEYS

INVENTOR.
RICHARD F. LOUMEAU
BY
Moody and Phillion
ATTORNEYS

INVENTOR.
RICHARD F. LOUMEAU
BY
Moody and Phillips
ATTORNEYS

Aug. 22, 1967 R. F. LOUMEAU 3,337,850
DIGITAL PHASE TRANSITION DETECTOR
Filed Oct. 21, 1963 6 Sheets-Sheet 5

INVENTOR.
RICHARD F. LOUMEAU
BY
Moody and Phillion
ATTORNEYS

INVENTOR.
RICHARD F. LOUMEAU
BY
Moody and Phillion
ATTORNEYS

United States Patent Office 3,337,850

Patented Aug. 22, 1967

3,337,850

DIGITAL PHASE TRANSITION DETECTOR

Richard F. Loumeau, Newport Beach, Calif., assignor to Collins Radio Company, Cedar Rapids, Iowa, a corporation of Iowa Filed Oct. 21, 1963, Ser. No. 317,569
12 Claims. (Cl. 340—172.5)

This invention relates, generally, to time synchronous communication systems in which a tone signal is formed into bits of information by dividing the tone signal into equal time intervals of different phases with the nature of each information bit being determined by its phase relation with a reference phase, usually the phase of the preceding bit and, more specifically, the invention relates to a means for deriving a synchronizing signal from a composite signal composed of a plurality of such tone signals.

The art of transmitting information by employing time-synchronously divided tone signals into segments having different phases which represent information stored therein, is fairly well developed. In such time synchronous systems each bit of information is carried on a tone signal and occurs during a given interval of time, with the intervals of time representing each bit being equal in length and occurring consecutively. The phase of the tone signal during each bit interval determines the information carried by the tone signal during the given time interval with respect to some reference phase, usually the phase of the immediately preceding bit. The name given to each of these short intervals or segments of tone signals is "phasor." Thus, it can be said that the information contained in a given phasor is determined by comparing the phase of said given phasor to the phase of the immediately preceding phasor.

As will be described in detail later herein, each tone signal may carry one or more channels of information thereon. For example, if only a single channel of information is being carried on the tone signal, a phase difference of 180° between any two phasors will represent the difference between a mark or a space. Thus, zero phase can arbitrarily be assigned to a given phasor to represent a mark. If the next phasor is 180° removed from said given phasor, the said next phasor will represent a space. If the tone signal contains two channels of information, it is necessary to have four possible phasor positions, each position representing a particular combination of a mark or a space of a first channel and a mark or a space of the second channel. Such four possible phasor positions ordinarily are spaced 90° apart to obtain optimum operating conditions. For a detailed discussion of such a system reference is made to U.S. Patent 2,905,812 issued Sept. 22, 1959, to Melvin L. Doelz et al., entitled "High Information Capacity Phase Pulse Multiplex System," and which is incorporated herein by reference.

When a number of tone signals, each carrying one or more channels of information, is transmitted simultaneously and received at a common receiver, each tone signal being time synchronously divided by the same time base into bits of information, it has been found that with the proper frequency spacing between tone signals and with the proper relationship between the lowest tone signal and the frequency spacing, the composite waveform formed by all of the tone signals will have a period of its own wherein the waveform of the composite signal will repeat itself at certain definite periods related directly to the period of the frequency spacing. Thus, if the bit interval is made longer than the periodicity of the composite signal, then during each bit period there will be an exact correlation between different portions thereof. By delaying the received composite signal time interval equal to the periodicity (the period of the composite signal), the correlation between the similar portions of each bit can be detected. More specifically, a correlation detector can be employed to compare the undelayed received composite signal and the delayed received composite signal to produce a null during the period when correlation between the two signals exists.

From such correlation procedure, the synchronizing signal necessary to drive a time base generator at the receiver can be obtained. The general method for obtaining such correlation by delaying the received composite signal is described in detail in co-pending application, Ser. No. 313,607 filed Oct. 3, 1963, by Earl T. Heald now Patent No. 3,294,907 and entitled, "Synchronizing Signal Deriving Means."

One of the principal difficulties in obtaining the synchronizing signal by means of the correlation method is the obtaining of the proper delay in the received composite signal. Relatively small variations in delay will seriously affect the performance of this method of deriving a synchronizing signal.

It is a main object of the invention to provide a reliable and accurate circuit means for obtaining a synchronizing signal from a received composite time synchronous signal containing a plurality of signal tones.

Another object of the invention is the use of digital techniques to detect correlation in a received composite signal and thereby to derive a synchronizing signal.

A third object of the invention is the improvement, generally, of means for reproducing a synchronizing signal from a composite received signal comprised of a plurality of tone signals.

In accordance with the invention, a memory device is provided having a sufficient number of cells to accommodate accurate samplings from the received composite signal. Also provided is a circuit means including a master clock means for sampling the received composite signal over an interval of time equal to the correlation period (the interval of time between the beginning of a bit and the beginning of the correlating portion of the bit) of the received composite signal, and to store said samplings in successive memory cells of said storage device. Other circuit means are provided to read from said memory device the stored samplings at a later time interval, measured from the storage time, equal to the correlation period of the received composite signal. Comparison means are then provided to compare each sample read from the memory device with the sample currently being taken of the received composite waveform. Since the delay time of the sample read from the memory device is equal to the correlation period, the two samplings should be substantially coincident. If the comparison means is a subtracting circuit, the output will be a null during the period of correlation. Since such period of correlation occurs once during each bit, there will be produced a series of nulls having a repetition rate exactly equal to the bit rate of the received composite signal and having a known phase relationship with the phase transition times of the bits in the received composite signal.

In accordance with a feature of the invention, samplings of the composite waveform fall into one of two possible states. One of such states results in a ONE being stored in the memory device if a sampling occurs when the composite waveform is positive and the other state results in a ZERO being stored in the memory device when the composite waveform is negative at sampling time. During readout of the memory device there will appear a series of positive sampling pulses which correspond to the positive portions of the received composite waveform. No sampling pulses will appear during the times corresponding to the sampled portions of the received composite waveforms which were negative. Thus, there is established a set of samplings which by their presence and absence define the ZERO crossings of the composite waveform and which function to provide the necessary means of identifying the correlative portions of the received bits.

The above-mentioned and other objects and features of the invention will be more clearly understood from the the following detailed description thereof when read in conjunction with the drawings in which:

FIG. 1 shows a general block diagram of circuit means for generating and transmitting the composite signal comprised of the plurality of tone signals;

FIG. 1*a* is a vector diagram showing the possible phasor positions of a two-channel tone signal:

Figure 6:
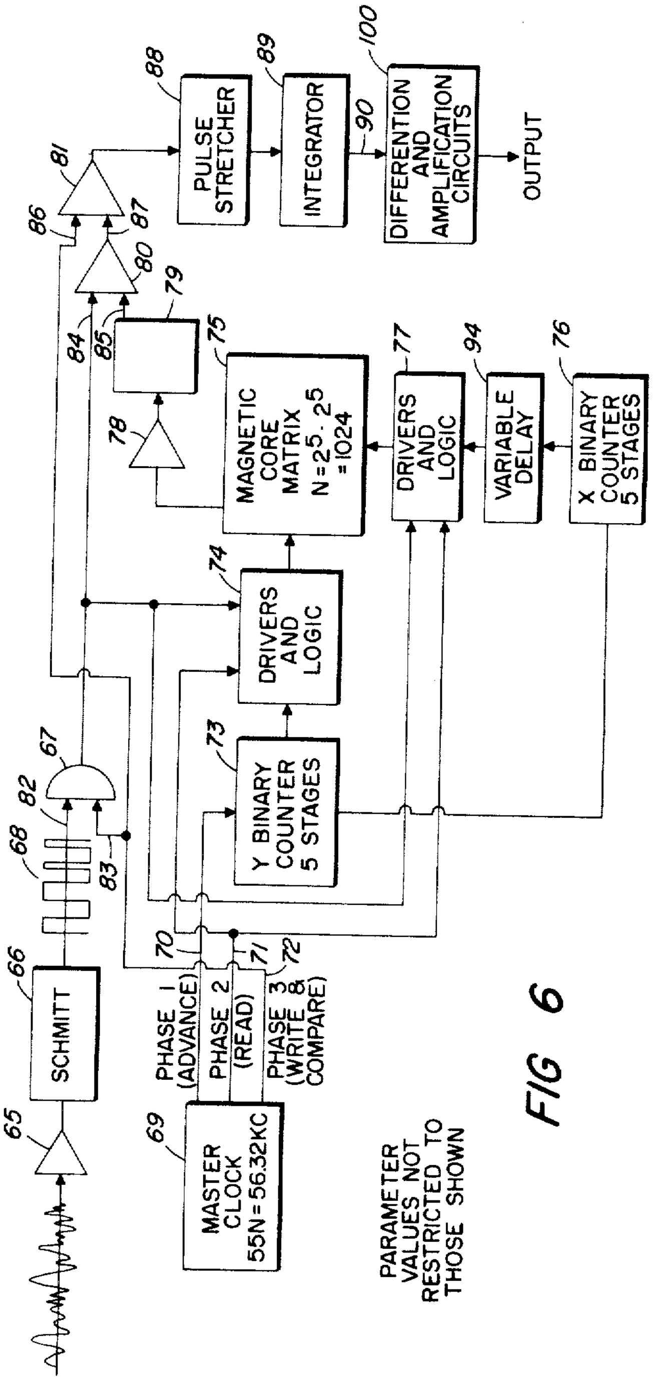
Figure 7:
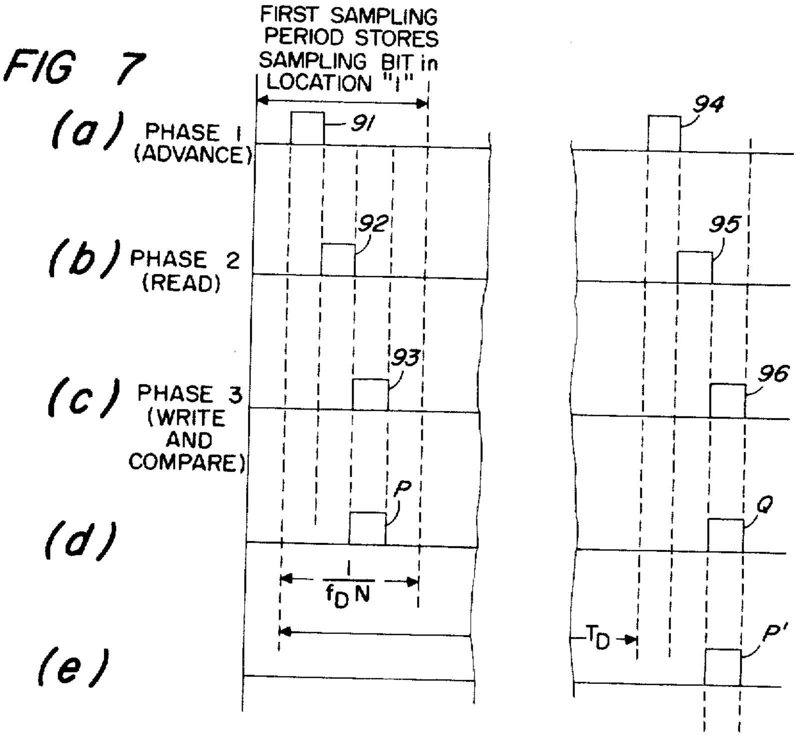

FIG. 6 shows a block diagram of the memory device and associated circuit means required to sample the received composite waveform and to write into and read from the memory device the samplings, and the comparison means for comparing the stored samplings with the currently received samplings to produce a synchronizing signal derived from the correlation periods; and FIG. 7 is a fourth set of waveforms showing the time relationship of the signals employed in the circuit of FIG. 6.

Figures 1, 1A:
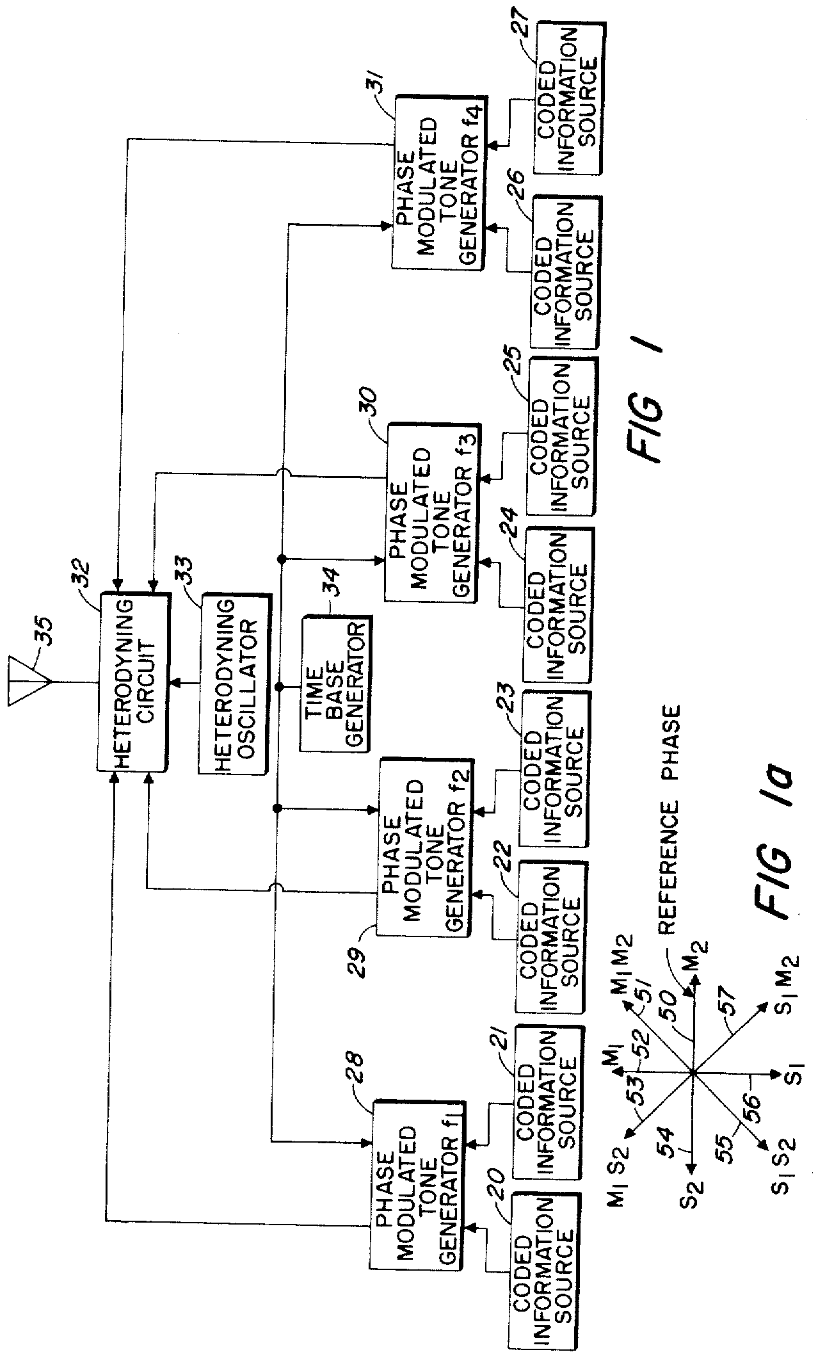

Referring now to FIG. 1, there are shown four pairs of coded information sources with each pair having their outputs supplied to a separate phase modulated tone generator. For example, coded information sources 20 and 21 have their output signals, which comprise the channel I and channel II information supplied to the tone generator 28 which functions to change the usually binary coded information from the sources 21 and 20 into phasors as shown in FIG. 1*a*. The tone generator 28 will generate the phasor having a particular phase relationship with reference to the vector 50 in accordance with the particular information supplied by sources 20 and 21. For example, if the information supplied is a mark from both sources, (assuming source 20 to be channel I and source 21 to be channel II), then the phasor 51 will be generated. If the next subsequent information supplied by sources 20 and 21 are a mark and a space, respectively, then the phasor generated will be phasor 53. It is to be understood that the preceding phasor 51 has now become the reference phase identified by phase position 50 so that the phase angle between the preceding phasor $M_1M_2$ and the new phasor 53 (or $M_1S_2$) is 135°. For a more detailed explanation of the foregoing, reference is made to the aforementioned co-pending application, Ser. No. 313,607, filed Oct. 3, 1963, by Earl T. Heald and entitled "Synchronizing Signal Deriving Means." In a similar manner tone generators 29, 30, and 31, which have tone signal frequencies $f_2$, $f_3$, and $f_4$, respectively, receive information from coded information sources 22 through 27 to generate phasors representative of the information received.

All the phasors generated by generators 28 through 31 have different frequencies which are spaced apart by an amount which will be discussed in more detail later. Further, all the phasors generated have a time duration controlled by the common time base generator 34 which initiates and terminates all of the phasors at the same instant of time and in a time synchronous manner. The phasors generated are supplied to a heterodyning circuit 32 which, in combination with heterodyning oscillator 33, steps up the frequency to the value suitable for transmission from antenna 35.

Figure 5:
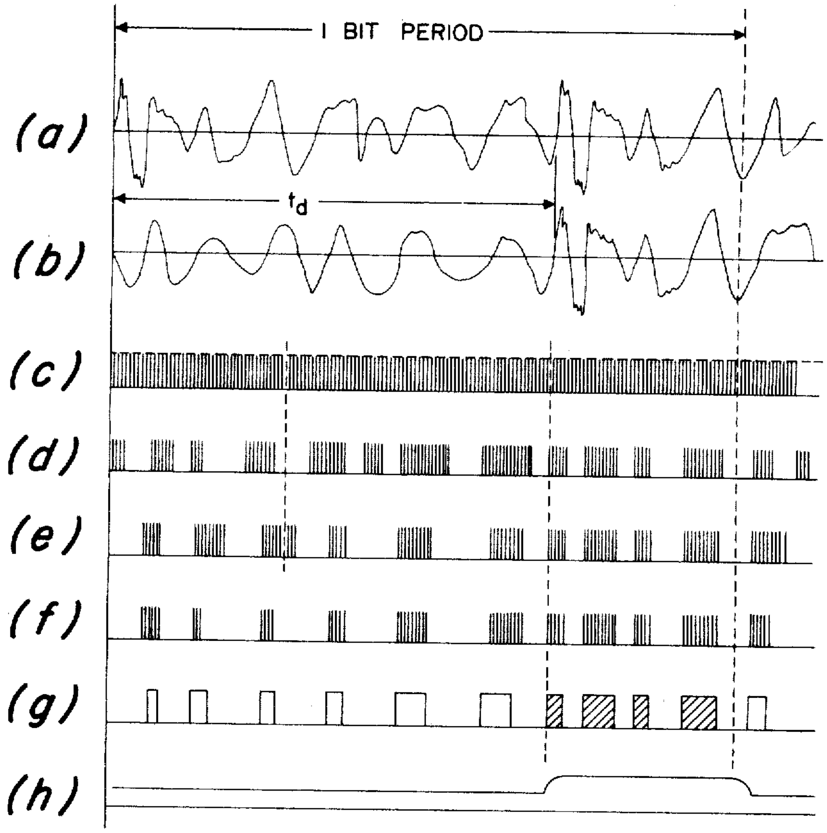
FIG. 5 is a third set of waveforms showing a single bit both in its delayed and undelayed form and the samplings taken of said waveform, and also the samplings which are read from the memory device.

In FIGS. 4*a*, 4*c*, 4*d*, and 4*e* there are shown the signals generated by the four tone generators 28 through 31, respectively. While FIGS. 4*a*, *c*, *d*, and *e* show these signals symbolically, FIG. 4*b* shows an actual waveform typical of what might be generated by any one of the generators 28 through 31. FIG. 5*f* shows the sum of all of the four phasors generated by the generators 28 through 31 and is herein referred to as the composite signal. Such composite signal is, as indicated above, heterodyned to a higher frequency for transmission purposes.

Figure 2:
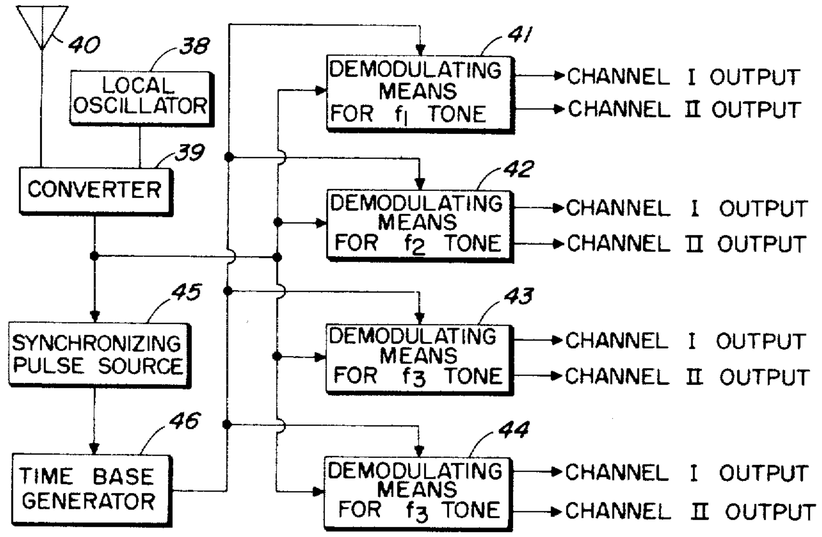
FIG. 2 is a general block diagram of a receiving means for receiving and demodulating the composite signal.
Figure 3:
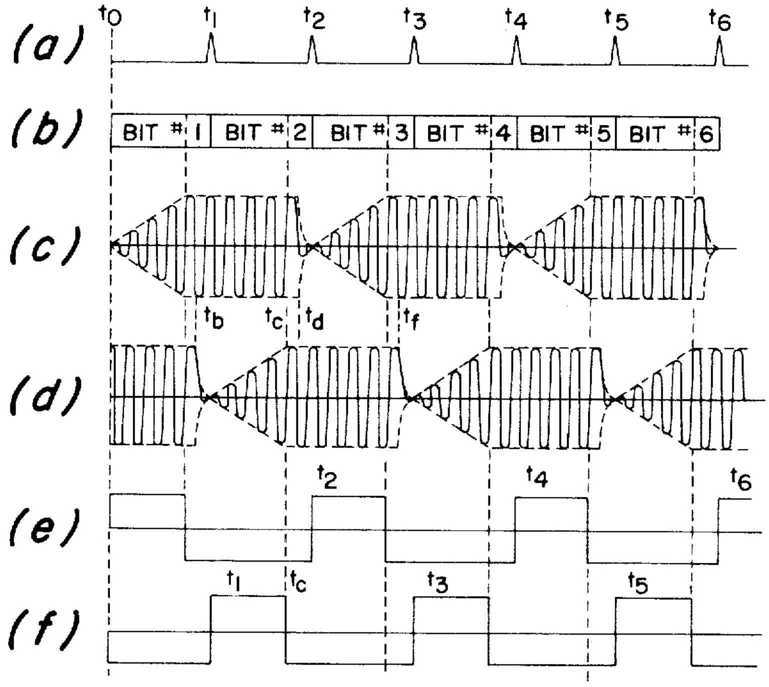
FIG. 3 is a set of waveforms showing the general nature of a given tone signal and the means by which the information contained in one bit is determined by its phase relationship with the phase of the preceding bit.
Figure 4:
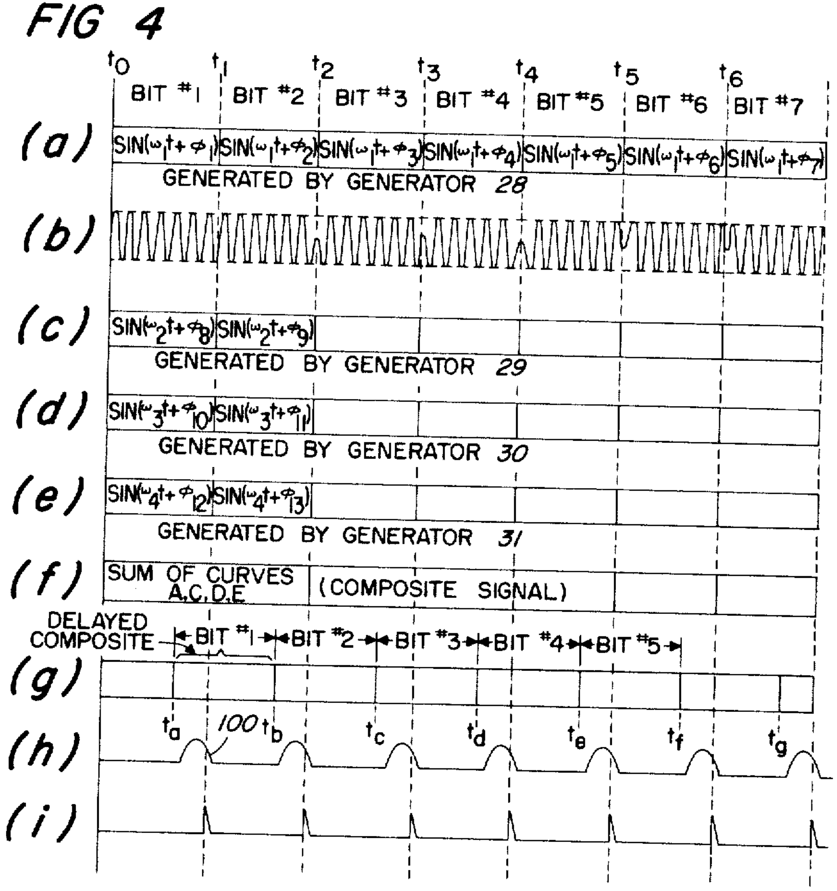
FIG. 4 is another set of waveforms showing the individual tone signals and the relationship between the delayed received composite signal and the undelayed received composite signal, as well as the synchronizing signal derived therefrom.

In FIG. 2 there is shown a receiver wherein the signal transmitted from the circuit of FIG. 1 is intercepted by antenna 40 and converted back to a lower frequency by means of converter 39 and local oscillator 38. The reproduced composite tone signals are then supplied to demodulating means 41, 42, 43, and 44, each of which contains filters tuned to a specific one of the four tone signals. More specifically, demodulating means 41 contains filters tuned to the tone signal $f_1$; demodulator 42 contains filters tuned to the frequency $f_2$ and demodulators 43 and 44 contain filters tuned to the tone signal frequencies $f_3$ and $f_4$, respectively. The demodulating means 41 through 44 function to derive the two channels of information encoded thereon. To perform this function it is first necessary, however, to reproduce at the receiver a synchronizing signal indicating the phase transition times, i.e., the point in time where one bit terminates and the next bit begins. Such transition times are indentified as $t_0$, $t_1$, $t_2$, $t_3$, $t_4$, $t_5$, and $t_6$ in FIGS. 3 and 4.

The specific means by which such synchronizing signal is reproduced at the receiver forms the subject matter of this invention. However, before describing such specific means, a brief resume of the operation of the receiver will be supplied to provide the reader with a better background with which to understand the invention.

In FIG. 3*b* there is shown a single tone signal which will be assumed to have been extracted from the composite tone signal by the demodulating means 41 of FIG. 2. Within said demodulating means 41 there are two filters known as keyed filters. These keyed filters are connected in parallel and are essentially energy integrators having alternate driving periods wherein a phasor of the received tone signal builds up an oscillatory signal in the keyed filter immediately followed by a ringing period during which the filter is disconnected from the tone signal and allowed to ring freely. The two keyed filters are constructed to be driven in an alternate manner by the received phasors. More specifically, keyed filter No. 1 may be driven by the odd numbered bits in the received tone signal and keyed filter No. 2 may be driven by the even numbered received bits in the received tone signal. The ringing period of the keyed filter provides the reference phase against which the phase of the next received bit is compared to determine the information contained in said next received bit. For example, assume that bit No. 1 drives keyed filter No. 1 as shown in the interval of time $t_0$–$t_b$ in FIG.3*c*. Then. during the time interval $t_b$–$t_c$ the keyed filter No. 1 is permitted to ring. During the reception of the second bit, keyed filter No. 2 is connected to the tone signal by appropriate switching means and is driven thereby during the time interval $t_1$–$t_c$, as shown in FIG. 3*d*. Ringing in the second keyed filter then occurs during time $t_e$–$t_f$. During the short time interval $t_c$–$t_d$, the phase of the signal in the second keyed filter (FIG. 3*d*) is compared by suitable phase comparing means with the phase of the ringing signal (FIG. 3*c*) stored in keyed filter No. 1. By such means the information contained in the phasor (bit 2) of FIG. 3*d* can be determined. The curves of FIG. 3*e* and 3*f*, respectively, represent the driving pulses for keyed filters 1 and 2, respectively. By such driving pulses the received tone signal is connected to the keyed filters during the periods of time corresponding to the upper levels of the driving signals and disconnected therefrom during the lower levels thereof. For a further discussion of the operation of the receiver reference is made to the aforementioned U.S. Patent 2,905,812.

As discussed briefly above, it is a characteristic of the composite signal that it is a reoccurring signal in and of itself, i.e., the composite signal is cyclical so that its waveform will repeat at periodic time intervals. Such time intervals are identified herein as the correlation period, or the periodicity of the composite wave signal, and are determined by the frequency spacing between the tone signals $f_1$, $f_2$, $f_3$, and $f_4$, and the relationship between the lowest tone signal $f_1$ and said frequency spacing $f_d$. More precisely, it has been found that if the lowest tone signal $f_1$ is an integral multiple of the difference frequency $f_d$, then periodicity will occur at intervals of time equal to $$\frac{1}{f_d}=T_d$$

where $T_d$ is the period of the difference frequency. Since the lowest tone frequency is an integral multiple of the difference frequency, the number of cycles of delay of each of the tone signals will be a whole cycle at the end of the time period $T_d$, thus creating the same phase conditions that existed at the beginning of the time period $T_d$. Consequently, if the periodicity of the received composite signal is made slightly less than the bit period, then during each bit there will be portions of said bit at the beginning thereof and the end thereof in which the received composite signal is identical, i.e., is correlative. By delaying the received composite signal an interval of time $T_d$, the correlating portions of delayed and undelayed signals can be made to coincide in time. By subtracting the delayed composite signal from the undelayed composite signal, nulls will appear during the correlating portions. Such nulls have a frequency exactly equal to the bit rate of the received composite signal and have a known phase relationship with the phase transition time. From such nulls, the synchronizing signal is reproduced.

A circuit for effectively delaying the received composite signal for the proper period of time and then comparing it with the undelayed received composite signal is shown in FIG. 6, which forms the essence of the present invention. Generally speaking, the circuit of FIG. 6 accomplishes its purpose by means of storing digital samplings of the received composite signal in a suitable memory, such as a magnetic memory, on a sequential basis for the desired delay time, and then at the end of the desired delay time, reading the stored samplings out of the memory device and comparing them with samplings of the undelayed received composite signals.

The storage medium can be a single magnetic core plane 75 (FIG. 6) in which addressing is done on a sequential basis under control of a master clock pulse source 69, the five stage binary counter 73 with its associated driver and logic circuit 74, and the five stage binary counter 76 with its associated drivers and logic circuits 77. The block 94 is a variable delay mans, the purpose of which will be described herein later.

The sampling of the received composite waveform, the writing of the sampled information into the memory and the erasing of the information stored from the magnetic memory are under the control of the master clock pulse source 69 and are accomplished in three separate phases. Specifically, these phases are advance, read, and write and compare, and occur in that order under control of the series of timing pulses 91, 92, and 93, shown in FIGS. 7*a*, *b*, and *c*. Such timing pulses are generated by the master clock pulse source 69.

At this point, it is appropriate to discuss the general theory of detecting correlation by sampling the received delayed and undelayed received composite signals. Generally speaking, there are two characteristics by which correlation of the two reoccurring portions of the delayed and undelayed composite signals can be identified with each other. These two characteristics are first, an exact coincidence of amplitude and, second, the coincidence of zero crossings. In such a complex waveform as a composite received waveform, the zero crossings are not periodic but rather have a changing pattern which varies throughout the length of the time interval $T_d$. Such a pattern of zero crossing, at the end of the time interval $T_d$, begins to repeat itself and will continue to do so until the next subsequent bit occurs.

It is possible to sample the received composite signal at certain predetermined short intervals of time and then to store the amplitude of each separate sampling in a digital memory. However, to do so would require a larger memory since each sampling would require four, five or six bits depending upon the accuracy with which the amplitude of the sampling is to be determined.

A simpler way of sampling the received composite signal is to determine only the zero crossings. It has been found that the determination of only the zero crossings, and ignoring the amplitude of the composite signal, will result in a highly accurate determination of correlation of the delayed and undelayed composite signals. The advantage of determining only the zero crossings is the elimination of a complex memory. More specifically, the determination of the zero crossings is effected by creating positive sampling pulses during the positive portion of the received composite signal and no pulses during the negative portion of the received composite signal. The zero crossings are thus determined at the beginning and end of each group of positive sampling pulses. It is this latter method of determining only the zero crossings which is described in the present invention. It is to be understood, however, that the method of determining correlation by sampling and storing the amplitudes of the sampling is included within the scope of this invention.

In FIG. 5*a* there is shown a received bit and a small portion of the next succeeding bit. In FIG. 5*b* there is shown the bit of 5*a* delayed a time interval $T_d$. Also shown in 5*b* is a portion of the preceding bit. FIG. 5*c* shows sampling pulses generated by the master clock pulse 69 of FIG. 6. The sampling pulses of FIG. 5*c* function to produce a resultant sampled pulse pattern, which occurs only during the positive portion of the bit of FIG. 5*a*, and is stored in memory 75. Such resultant sampled pulse pattern is shown in FIG. 5*d*.

Each of the individual sample pulses of FIG. 5*c* is designated herein as a one bit sample (not to be confused with an information bit) and the resulting pulse thereof, as shown in FIG. 5*d*, can be either a positive pulse or a zero depending upon the polarity of the information bit of FIG. 5*a*. The resulting one bit samples of FIG. 5*d* are stored in successive locations of the magnetic memory core 75, each location consisting of a single core. The core locations are uniquely defined by selection of an X and a Y lead, using a Cartesian co-ordinate system. In its operation a bit from any core location can be read from a memory location or written into a memory location by the simultaneous application of a current $i/2$ on each of the two leads constituting a pair of leads comprised of an X lead and a Y lead. The current value $i$ is chosen such that it can switch the core from one state to another within the time of its duration, but the current value $i/2$ is insufficient to switch the core in any amount of time. The currents $i/2$ are supplied from the driver circuits contained in blocks 74 and 77 under control of the Y and X binary counters 73 and 76, respectively. The binary counters 73 and 76 in coaction with the circuitry in the blocks 74 and 77, which consists primary of AND gates (not specifically shown), function to select the magnetic cores in the matrix of cores 75 in a sequential order. The binary counters 73 and 76 are under direct control of the advance pulses from the master clock 69 and function to advance the address in the memory 75 by a single count in response to a single advance pulse from the master clock source 69.

For reading of information into the magnetic cores, currents of positive polarity can be employed. For writing from the individual magnetic cores of memory 75, negative currents of magnitude $i$ are employed. Since the readout is accomplished by single bits, a single, common, sense winding and a single read amplifier 78 is all that is necessary.

There are three operations which must be applied to the magnetic core matrix 75. These three operations are "read," "write," and "advance." Obviously, "advance" can not be performed simultaneously with either the "read" or the "write" operation without an accompanying loss of signal and possible cross talk. Because of the destructive readout property of ordinary magnetic cores, the "reading" function must be performed before the "writing" function. Note that since each bit is stored solely for the purpose of achieving delay, it need not be regenerated for future use after a single readout destroys the bit. Because the three operations must be performed in sequence, the master clock must generate the three phase pulses shown in FIG. 6*a*. Each of these phase pulses has a duration of about one-fourth the entire sampling interval. Hence, there will be a spare phase interval as shown in FIG. 6*a*. The three active phases are, as follows:

| | |
|---|---|
| Phase 1 | Advance. |
| Phase 2 | Read. |
| Phase 3 | Write (and compare) |

Although FIG. 6 shows binary counters followed by logic circuits 74 and 77 as the means for addressing the memory 75, other means such as X and Y co-ordinate selecting shift registers (not shown) can be employed. The use of binary counters and AND circuits, however, are more reliable in the presence of impulse noise and require fewer components. It is for these reasons that the use of a binary counter is selected for the preferred embodiment of the invention. It might be noted that binary counters employing magnetic cores and diodes provide good operation from a reliability standpoint.

There will now be described a complete cycle of events during a sampling interval. The wave shaping circuit, consisting of amplifier 65 and Schmitt trigger circuit 66, produces a two-level waveform 68 which changes levels in accordance with the zero crossings in the composite wave. In response to the phase 3 pulse (the "write and compare" phase) the input gate 67 is enabled so that a sampled bit is taken of the waveform 68. Assume that such a sampled bit is positive in nature and identified by the bit P in FIG. 7*d*. Assume, further, that the sampled bit P is stored in location 1 in the memory. At $T_d$ seconds later, $n$ samples have been stored in the magnetic memory 75 and we arrive at the $N+1$ sampling interval. A phase 1 pulse 94 of FIG. 7*a* advances the counters 73 and 76 so that we now change access from location $n$ back to location 1. The phase 2 pulse 95 of FIG. 7*b* causes an interrogation of location 1 to read out the bit (bit P) stored in location 1 to sense amplifier 78. A phase 3 pulse 96 then opens the input gate 67 to cause another sample Q of waveform 68 to be stored in location 1, replacing the sampled bit P which has been read out of location 1.

A delay means 79 functions to delay the readout sampled bit P for one phase interval. It can be seen from an examination of the pulses of FIG. 7*d* and FIG. 7*e* that pulse Q and the delayed pulse P (being read from memory 75) occur simultanously on the input leads 84 and 85 of AND gate 80 in FIG. 6. AND gate 80 will respond to the appiled pulses to produce a positive pulse on the lead 87 of AND gate 81. Such positive pulse will be coincident in time with the write and compare pulse 96 generated by the master clock pulse during phase 3. Consequently, AND gate 81 will pass a positive pulse to pulse stretcher 88, the output of which is then supplied to the integrator 89. The function of pulse stretcher 88 is to stretch the individual discrete samples so that they extend into the other, thus producing a continuous waveform rather than one comprised of discrete pulses. The output of pulse stretcher 88 is supplied to integrator 89 which eliminates the higher frequency components of the supplied waveform to produce a waveform similar to that shown in FIG. 4*h*, wherein each of the individual pulses, such as pulse 100, represents a correlation. There is, however, a certain inherent delay in the integrated circuit 89. Advantage is taken of this delay to cause the output pulses thereof, which represent the correlation intervals, to occur at the phase transition times of the received phasors. Thus, the pulse 100 of FIG. 4*h* occurs at a phasor transition time. Differentiation and amplification circuit 100 is constructed to respond to the output of the integrator circuit 89 to produce more sharply defined pulses, such as shown in FIG. 4*i*, which more precisely indicate the phase transition times of the received phasors. By such differentiation and amplification, narrow pulses of several tenths of a microsecond, can easily be obtained.

It is possible to obtain a very substantial increase in the reliability of the phase transition pulses when they are considered as a sequence. More specifically, since it is known that the phase transition pulses must occur at time intervals equal to $1/R$ where R is the bit rate, we can delay the $n$th phase transition pulse by a time interval $1/R$ and AND it with the $N+1$ phase transition pulse. The AND gate (not shown) will deliver an output only when two such pulses are properly spaced, i.e., coincident. Such a procedure will not only eliminate erroneous pulses due to noise but will also reduce jitter associated with good pulses. Obviously, this same principle could be extended so that any number of phase transition pulses occurring in sequence must occur with the proper spacing in order to produce an output pulse. When a rapid correction is required for automatic gain control, for example, the principle can be extended to three pulses in sequence being supplied to an AND gate. In a slower synchronizing signal correction mode, integration can occur over a longer sequence of phase transition pulses.

With respect to the frequency of the sampling process, it is necessary that the sampling rate be at least twice the highest frequency component of the composite wave. Further, the number of samples in a given bit period is related to the delay time $T_d$ so that the sampling rate $R_s$ is as follows:

$$R_s T_d = N$$

where N is necessarily an integer. Therefore:

$$R_s = \frac{N}{t_d} = N f_d$$

where $f_d$ is the difference frequency between tones.

In the above expression the minimum repetition rate would be somewhat more than twice the maximum tone signal since N must be an integer. Furthermore, since the sampling is done at less than an infinite rate, there is a quantizing error associated with the sampled data. Only samples taken between zero crossings yield unique values. Bit samples which occur very close to, or at the zero crossings, will yield ones and zeros at random. For any given frequency $f_h$ being sampled, such random noise bits occur at the rate of $$2\frac{f_h}{R_s}$$

It can be shown that for a composite wave of two frequencies, the number of zero crossings is the same as that for the highest frequency acting alone. Therefore, the quantization noise should be computed on the basis of the highest signal frequency present in the composite wave. Hence, with a highest tone frequency of about 3000 cycles per second and a difference frequency of 55 cycles per second, to obtain a sampling signal having not more than 12 percent erroneous bits due to quantization, the sampling frequency should be about $$\frac{2\times 3000}{.12}=50 \text{ kilocycles}$$

and the memory plane should have about $$\tfrac{1}{55}\times 50{,}000\cong 900 \text{ cores or addresses.}$$

Returning again briefly to the receiver of FIG. 2, the synchronizing pulses of FIG. 4*i*, which are obtained at the output of the differentiation and amplifying circuits 100 of FIG. 6, are supplied to the time base generator 46 which, in turn, employs such synchronizing pulses in generating the various timing signals necessary in demodulating the received composite signal. The synchronous pulse source 45 of FIG. 2 corresponds to the entire circuit of FIG. 6.

It is to be noted that the form of the invention shown and described herein is but one preferred embodiment thereof and that various changes may be made therein without departing from the spirit or scope of the invention.

I claim:

1. In a communication system employing a composite signal having a plurality of tone signals spaced apart by a different frequency $f_d$ and in which the lowest tone signal has a frequency equal to $P/2$ times the difference frequency $f_d$, where P is an integer, and in which information bits are encoded upon each tone signal in a coincident time synchronous manner with the period of each bit being greater than $1/f_d$;

means for reproducing a synchronizing signal having a known frequency and phase relationship with the repetition rate of said bits and comprising:

sampling means for sampling the received composite signal currently being received at a sampling rate $R_s$, where $R_s$ is more than twice the frequency of the highest tone signal, storage means comprising a plurality of storage locations for storing each sampling of said composite signal in the chronological order of sampling, read-out means constructed to read the stored samplings out of said storage means in the same chronological order in which said samplings were stored, means for comparing currently received samplings of the received composite signal with samplings read out of said storage means and originally sampled at a time interval $1/f_d$ prior to said currently received samplings.

2. Means for producing a synchronous signal in accordance with claim 1 in which said storage means employs N storage locations where $$N=T_dR_s, \text{ and } T_d\frac{1}{f_d}$$

3. Means for producing a synchronous signal in accordance with claim 2, comprising:

timing means, said sampling means constructed to respond to said timing means to sample said received composite signal, addressing means constructed to respond to said timing means to address said storage locations in said storage means in accordance with said chronological order, and in which said read-out means is responsive to said timing means to cause read-out from said storage locations immediately before storage into said storage location and during the addressing of each individual storage location.

4. Means for producing a synchronous signal in accordance with claim 3 in which said addressing means comprises counter means constructed to respond to pulses from said timing means to address the storage locations of said storage means in said chronological order.

5. In a communication system employing a composite signal comprising plurality of tone signals spaced apart by a difference frequency $f_d$ and in which the lowest tone signal has a frequency equal to $X/2$ times the difference frequency $f_d$, where X is an integer and in which information bits are encoded upon each tone signal in a coincident time synchronous manner with the period of each bit being greater than $1/f_d$;

means for producing a signal having a frequency equal to the bit rate of the received tone signals and comprising:

sampling means for sampling the received composite signal as it is currently received at a sampling rate $R_s$, where $R_s$ is more than twice the frequency of the highest tone signal, storage means having a plurality of storage locations therein, each with a unique address, accessing means including write-in means for writing into said storage locations of said storage means, in a predetermined order of addressing the samplings of said composite signal, signal comparing means, means for supplying the current samplings of said received composite signal to said signal comparing means, said accessing means further including read-out means for reading out of said storage means the samplings stored therein in said same addressing order and for supplying said read-out samplings to said signal comparing means a time interval $1/f_d$ later than supplying of said current samplings to said signal comparing means.

6. Means for producing a synchronous signal in accordance with claim 5 in which said storage means employs N storage locations where $$N=T_dR_s, \text{ and } T_d=\frac{1}{f_d}$$

7. Means for producing a synchronous signal in accordance with claim 6 comprising:

timing means, and in which said accessing means comprises addressing means constructed to respond to each sampling pulse from said timing means to address a new storage location in said storage means in accordance with said predetermined order of addressing, and in which said write-in means and read-out means are responsive to said timing means to cause read-out from each storage location immediately before write-in into each storage location during the addressing of each storage location.

8. Means for producing a synchronous signal in accordance with claim 7 in which said addressing means comprises:

counter means constructed to respond to pulses from said timing means to address successive storage locations of said storage means in said predetermined order of addressing.

9. In a communication system employing a composite signal having a plurality of tone signals spaced apart by a difference frequency $f_d$ and in which the lowest tone signal has a frequency equal to $X/2$ times the difference frequency $f_d$, where X is an integer, and in which information bits are encoded upon each tone signal in a coincident time synchronous manner with the period of each bit being greater than $1/f_d$;

means for reproducing a synchronizing pulse having a frequency with a known relationship to the bit rate of the composite signal, comprising:

signal comparing means, means for sampling said received composite signal at a sampling rate $R_s$, where $R_s$ is more than twice the frequency of the highest tone signal, and for supplying said samplings substantially directly to said signal comparing means, delaying means for delaying said samplings and supplying said delayed samplings to said signal comparing means a time interval $T_d$ later than the supplying of the undelayed samplings to said signal comparing means, where $$T_d=\frac{1}{f_d}$$

said delaying means comprising storage means having a plurality of adressable storage locations and constructed to store signals representative of said samplings in said storage locations for an interval of time not greater than $T_d$, and in a predetermined order, said signal comparing means constructed to compare the delayed samplings and the undelayed samplings to detect the correlating portions of said delayed and undelayed samplings and to produce an output signal whose period is the same as the period of correlation.

10. A means for producing a synchronous signal in accordance with claim 9 in which said storage means employs N storage locations where $N=T_dR_s$.

11. A means for producing a synchronous signal in accordance with claim 10 comprising:

timing means, and addressing means constructed to respond to said timing means to address the storage locations in said storage means in accordance with said predetermined order, and comprising write-in means and read-out means constructed to respond to said timing means to cause read-out from each storage location immediately before write-in into each storage location during the addressing of each storage location.

12. Means for producing a synchronous signal in accordance with claim 11 in which said addressing means comprises counter means constructed to respond to pulses from said timing means to address the storage locations of said storage means in said predetermined order.

References Cited

UNITED STATES PATENTS

| | | | |
|---|---|---|---|
| 2,739,298 | 3/1956 | Lovell | 340—171 |
| 2,840,800 | 6/1958 | Chester | 340—174 |
| 2,905,812 | 9/1959 | Doelz et al. | 250—8 |
| 2,933,563 | 4/1960 | Hohmann et al. | 179—18 |
| 2,979,565 | 4/1961 | Zarcone | 178—50 |
| 3,185,823 | 5/1965 | Ellersick et al. | 235—154 |

ROBERT C. BAILEY, *Primary Examiner.*

R. M. RICKERT, *Assistant Examiner.*

UNITED STATES PATENT OFFICE

CERTIFICATE OF CORRECTION

Patent No. 3,337,850 August 22, 1967

Richard F. Loumeau

It is hereby certified that error appears in the above numbered patent requiring correction and that the said Letters Patent should read as corrected below.

Column 9, line 55, the equation should appear as shown below instead of as in the patent:

$$N=T_d R_s, \text{ and } T_d=\frac{1}{f_d}$$

Signed and sealed this 28th day of November 1967.

(SEAL)
Attest:

Edward M. Fletcher, Jr.
Attesting Officer

EDWARD J. BRENNER
Commissioner of Patents